(12) United States Patent
Krull et al.

(10) Patent No.: US 10,814,263 B2
(45) Date of Patent: Oct. 27, 2020

(54) FILTER MEDIA PACK WITH POROUS WRAPPER

(71) Applicants: Timothy L. Krull, Kearney, NE (US); Michael J. Von Seggern, Kearney, NE (US); Jeffrey E. D. Rogers, Kearney, NE (US)

(72) Inventors: Timothy L. Krull, Kearney, NE (US); Michael J. Von Seggern, Kearney, NE (US); Jeffrey E. D. Rogers, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 229 days.

(21) Appl. No.: 15/777,532

(22) PCT Filed: Nov. 14, 2016

(86) PCT No.: PCT/US2016/061837
§ 371 (c)(1),
(2) Date: May 18, 2018

(87) PCT Pub. No.: WO2017/087322
PCT Pub. Date: May 26, 2017

(65) Prior Publication Data
US 2018/0333668 A1 Nov. 22, 2018

Related U.S. Application Data

(60) Provisional application No. 62/257,836, filed on Nov. 20, 2015.

(51) Int. Cl.
*B01D 46/00* (2006.01)
*B01D 46/10* (2006.01)
(Continued)

(52) U.S. Cl.
CPC ......... *B01D 46/0097* (2013.01); *B01D 39/18* (2013.01); *B01D 46/10* (2013.01);
(Continued)

(58) Field of Classification Search
CPC ...... B01D 46/525–527; B01D 46/0097; B01D 46/10; B01D 2271/025; B01D 2271/027;
(Continued)

(56) References Cited

U.S. PATENT DOCUMENTS

| 5,820,646 | A | 10/1998 | Gillingham et al. |
| 2009/0320424 | A1 | 12/2009 | Merritt et al. |

(Continued)

FOREIGN PATENT DOCUMENTS

| EP | 1850943 A1 | 11/2007 |
| EP | 2140923 A2 | 1/2010 |

(Continued)

*Primary Examiner* — Robert Clemente
(74) *Attorney, Agent, or Firm* — Reinhart Boerner Van Deuren P.C.

(57) ABSTRACT

A filter media block and filter element incorporating same are provided. Methods of forming a filter media block and filter element are also provided. The filter media block includes a block of filter media and an outer permeable layer. The outer layer provides support for the block of filter media.

14 Claims, 7 Drawing Sheets

(51) Int. Cl.
  *B01D 46/52* (2006.01)
  *F02M 35/024* (2006.01)
  *B01D 39/18* (2006.01)

(52) U.S. Cl.
  CPC ......... *B01D 46/527* (2013.01); *F02M 35/024* (2013.01); *F02M 35/02408* (2013.01); *F02M 35/02441* (2013.01); *B01D 2271/027* (2013.01); *B01D 2273/28* (2013.01); *B01D 2275/10* (2013.01); *B01D 2275/40* (2013.01); *B01D 2279/60* (2013.01); *F02M 35/0245* (2013.01); *F02M 35/02425* (2013.01); *F02M 35/02483* (2013.01)

(58) Field of Classification Search
  CPC ............. B01D 2279/60; F02M 35/024; F02M 35/02425; F02M 35/0245; F02M 35/02483
  See application file for complete search history.

(56) References Cited

U.S. PATENT DOCUMENTS

| | | |
|---|---|---|
| 2010/0126129 A1* | 5/2010 | Kim .................. A47L 9/122 55/494 |
| 2013/0207304 A1 | 8/2013 | Brown et al. |
| 2013/0292875 A1 | 11/2013 | Swanson et al. |

FOREIGN PATENT DOCUMENTS

| WO | WO 2007/144405 A1 | 12/2007 |
|---|---|---|
| WO | WO 2011/115973 A2 | 9/2011 |
| WO | WO 2014/018528 A1 | 1/2014 |
| WO | WO 2016/057815 A1 | 4/2016 |

\* cited by examiner

FILTER MEDIA PACK WITH POROUS WRAPPER

FIELD OF THE INVENTION

This invention generally relates to filtration and particularly to filter elements used in filtration systems.

BACKGROUND OF THE INVENTION

Filtration systems are used to remove impurities from a stream of fluid such as from air for use in downstream systems. For example, air may be filtered prior to entering an internal combustion engine. In such a system, the filtration system will often include a replaceable filter element that performs the filtration, which can be replaced with a new filter once the filter element is filled with impurities or otherwise becomes spent.

In some systems, the downstream system creates a vacuum that draws the air through the filter element placing a negative pressure differential across the filter media of the filter element. This negative pressure differential can cause the filter element to contract in size in a direction generally perpendicular to the direction of airflow. Further yet, in some systems, the magnitude of the pressure differential is not constant causing the filter element to cyclically change size, i.e. when the magnitude decreases the filter element will relax and then when the magnitude increases the filter element will contract. Additionally, in some instances, the pressure drop across the filter element can place a large shear force on the seal of the filter element that seals the filter element within a filter housing of the filtration system. Finally, as a filter element becomes loaded with contaminants overtime, the pressure drop across the filter element increases in value causing the forces applied to the filter element to increase.

Unfortunately, overtime this cyclic change in size can cause parts of the filter element to degrade. This is particularly true in filter elements formed from layers of filter media such as fluted filter media. This degradation in combination with the forces acting on the filter element and seal can cause the filter element to prematurely fail, e.g. before the filter element can no longer adequately filter the flow of fluid. The filter element can fail in several ways including, but not limited to, having the seal decouple from the filter media or having the filter media fall apart such as having adjacent layers of filter media separate from one another. Failure is particularly problematic if the filter media, which is often a cellulose material, is exposed to moisture which will weaken the strength of the filter media and accelerate failure or allow failure at reduced loading.

Further yet, the filter element may include a mounting structure for mounting the filter element to a filter housing. The mounting structure may experience significant loading due to the pressure drop across the filter element. If the mounting structure is directly secured to the filter media, the forces acting on the filter media from the mounting structure become localized resulting in failure of the filter media and allowing the mounting structure to disconnect from the rest of the filter element or allowing for the formation of a leak path.

The present disclosure focuses on improvements over the current state of the art of filtration systems and particularly filter elements.

BRIEF SUMMARY OF THE INVENTION

Embodiments of the present invention provide, new and improved filter elements and methods of forming filter elements that provide improved attachment of seal members and/or mounting structures.

In a particular embodiment, a filter element including a media pack and a first seal (also referred to as a "seal member") is provided. The media pack includes a filter media material forming a block of filter media defining an outer peripheral surface extending between a first flow face and a second flow face. The media pack includes a second material secured to the outer peripheral surface of the block of filter media forming an outer layer surrounding the block of filter media. The first seal is attached to the second material. The first seal and second material provide an attachment for securing the first seal to the media pack capable of preventing failure from a loading of at least 35 pounds per inch of seal measured around the outer peripheral surface of the block filter media.

In one embodiment, the second material is permeable.

In one embodiment, the filter media has a first porosity and the second material has a second porosity that is greater than the first porosity.

In one embodiment, wherein the first seal is a mold in place seal.

In one embodiment, the first seal is a multicomponent seal including a first portion and a second portion. The first portion secures the second portion to the second material.

In one embodiment, the first seal penetrates into the second material.

In one embodiment, the filter media material is a fluted filter media including a corrugated sheet secured to a face sheet forming inlet and outlet flutes extending axially between the first and second flow faces.

In one embodiment, the second material is non-metallic and is secured to the outer peripheral surface of the block of filter media with an adhesive between the outer peripheral surface of the block of filter media and the second material.

In one embodiment, failure is at least one of breakage of the first seal, disconnection of the first seal from the media pack or breakage of the block of filter media.

In one embodiment, the first material has a Mullen burst strength that is less than the Mullen burst strength of the second material.

In one embodiment, the Mullen burst strength of the second material is at least double the Mullen burst strength of the first material.

In one embodiment, the second material is a single layer surrounding the block of filter media and extends circumferentially around the block of filter media between a first edge and a second edge. The edges generally extending axially in a direction that is generally orthogonal to the first and second flow faces.

In one embodiment, the first and second edges are spaced apart from one another forming a gap therebetween.

In one embodiment, the seal overlaps and fills the gap to prevent a leak path.

In one embodiment, a method of forming a filter element is provided. The method includes providing a block of filter media defining an outer peripheral surface from a filter media material; securing a second material that is permeable to the outer peripheral surface of the block of filter media forming an outer layer surrounding the block of filter media; and attaching a first seal to the second material. The first seal and second material provide an attachment for securing the first seal capable of preventing failure from a loading of 35 pounds per inch of seal measured around the outer peripheral surface of the block filter media.

In one embodiment, the second material is permeable.

In one embodiment, the filter media has a first porosity and the second material has a second porosity that is greater than the first porosity.

In one embodiment, the method includes molding the first seal to the second material after the second material is secured to the outer peripheral surface of the block of filter media.

In one embodiment, the first seal is a multicomponent seal including a first portion and a second portion. The first portion secures the second portion to the second material. The first portion provides a seal with filter housing to which the filter element may be mounted.

In one embodiment, the first seal penetrates into the second material.

In one embodiment, the filter media material is a fluted filter media including a corrugated sheet secured to a face sheet forming inlet and outlet flutes extending axially between the first and second flow faces.

In one embodiment, the second material is non-metallic and securing the second material includes applying an adhesive between the outer peripheral surface of the block of filter media and the second material. This may be done by applying the adhesive to the outer peripheral surface of the block of filter media and then attaching the second material or applying the adhesive to the second material and then applying the combination of the adhesive and the second material to the outer peripheral surface of the block of filter media.

In one embodiment, failure is at least one of breakage of the first seal, disconnection of the first seal from the media pack or breakage of the block of filter media.

In another embodiment, a media pack including first and second materials is provided. The first material is a filter media material that is permeable forming a block of filter media defining an outer peripheral surface. The second material is permeable and is secured to the outer peripheral surface of the block of filter media forming an outer layer surrounding the block of filter media. The filter media has a first tensile strength that is less than a second tensile strength of the second material. The second material has greater strength than the filter media.

In one embodiment, the second tensile strength is at least twice as great as the first tensile strength.

In one embodiment, the filter media has a first porosity and the second material has a second porosity that is greater than the first porosity.

In one embodiment, the filter media is a cellulose material and the second material is a polyester material.

In one embodiment, the second material is a non-woven fabric.

In one embodiment, the second material is a spun bond material.

In one embodiment, the second material has an unit weight of 8 oz per square yard.

In one embodiment, an adhesive is provided between the outer peripheral surface of the block of filter media and the second material.

In one embodiment, the adhesive is a urethane hot melt.

In one embodiment, the adhesive is applied in a random pattern.

In one embodiment, the random pattern is provided by applying the adhesive by spraying.

In one embodiment, the block of filter media defines an inlet face and an outlet face axially spaced apart from the inlet face.

In one embodiment, the second material extends axially between the inlet and outlet faces at least fifty percent the axial distance between the inlet and outlet face but less than the entire distance between the inlet and outlet face.

In one embodiment, the second material is a single layer surrounding the block of filter media and extends circumferentially around the block of filter media between a first edge and a second edge. The first and second edges extending orthogonal to the inlet and outlet faces.

In one embodiment, the first and second edges are spaced apart from one another forming a gap therebetween in a circumferential direction around the filter media block.

In one embodiment, the first material has a Mullen burst strength that is less than the Mullen burst strength of the second material.

In one embodiment, the Mullen burst strength of the second material is at least double the Mullen burst strength of the first material.

In one embodiment, a method of forming a filter element includes providing a block of filter media defining an outer peripheral surface from a filter media material that is permeable; securing a second material that is permeable to the outer peripheral surface of the block of filter media forming an outer layer surrounding the block of filter media. The filter media has a first tensile strength that is less than a second tensile strength of the second material.

In one embodiment, a filter element includes a media pack and a seal. The media pack includes a filter media material forming a block of filter media defining an outer peripheral surface extending between a first flow face and a second flow face. The media pack also includes a second material secured to the outer peripheral surface of the block of filter media forming an outer layer surrounding the block of filter media. The second material extends less than an entire distance between the first and second flow faces defining a portion of the outer periphery extending axially between the second material and one of the first and second flow faces that is not covered by the second material. The first seal is attached to the media pack. The first seal has a first portion in axial overlap with and secured to the outer layer and a second portion in axial overlap with and secured to the portion of the outer periphery that is not covered by the outer layer.

In one embodiment, the first seal is a mold in place seal.

In one embodiment, the first and second portions of the first seal are formed as a continuous body of seal material.

In one embodiment, the second portion of the first seal forms a continuous band that extends around the outer periphery of block of filter media to reduce the risk of a leak path being formed between the first seal and the block of filter media.

In one embodiment, a filter element includes a seal member for sealing with a filter housing and a media pack. The a media pack includes a filter media material forming a block of filter media defining an outer peripheral surface extending between a first flow face and a second flow face. The filter media pack includes means for directly securing the seal member to the outer peripheral surface of the media pack.

In one embodiment, the means for directly securing the seal member is a second material secured to the outer peripheral surface of the block of filter media forming an outer layer surrounding the block of filter media.

In one embodiment, the means for directly securing the seal member is a physically manipulated portion of the outer periphery of the media pack.

In one embodiment, the physically manipulated portion of the outer periphery includes perforations in the filter media material.

In one embodiment, the physically manipulated portion of the outer periphery includes an abraded portion of the filter media material.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
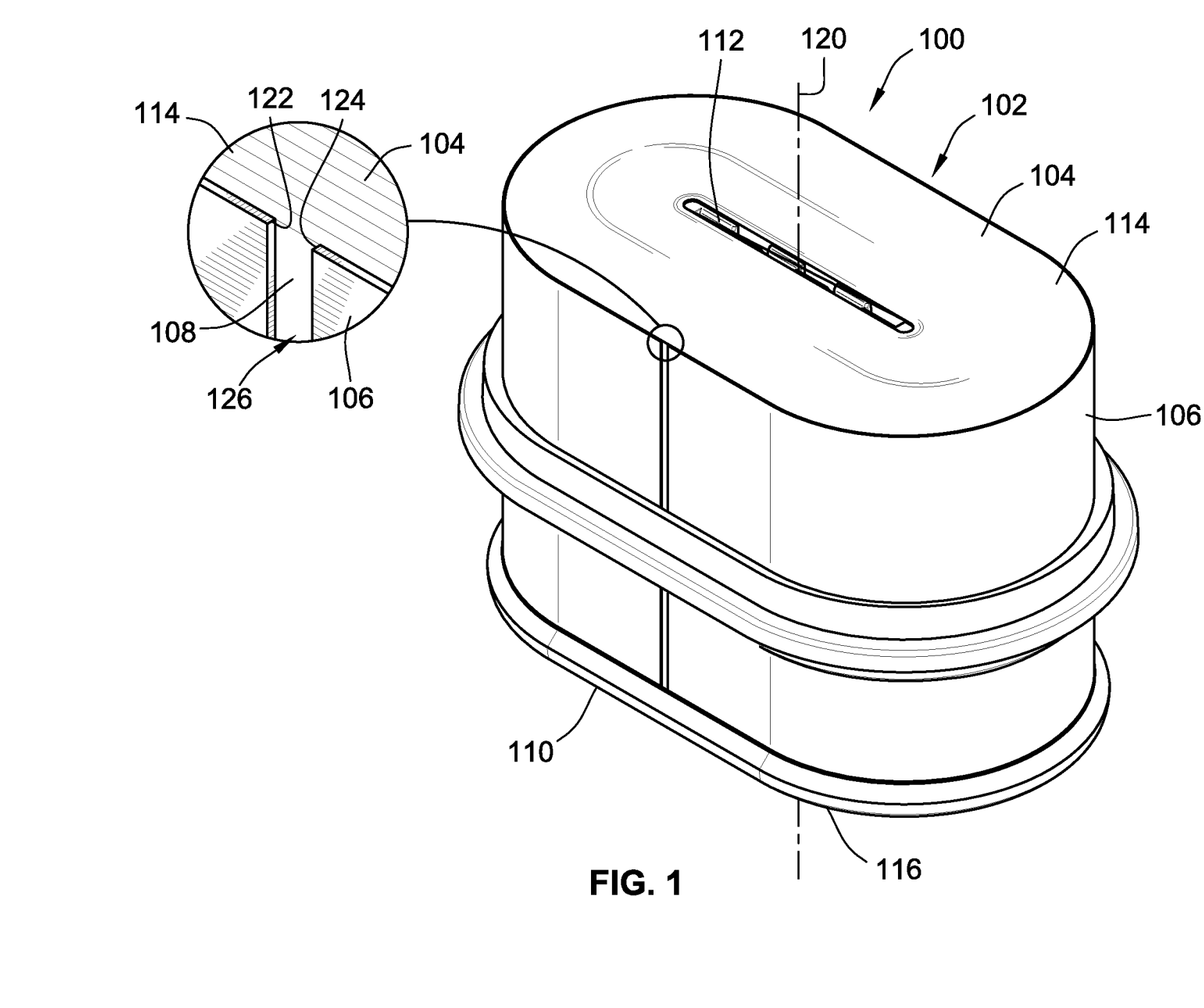
FIG. 1 is an isometric view of a filter element according to an embodiment of the present invention.
Figure 2:
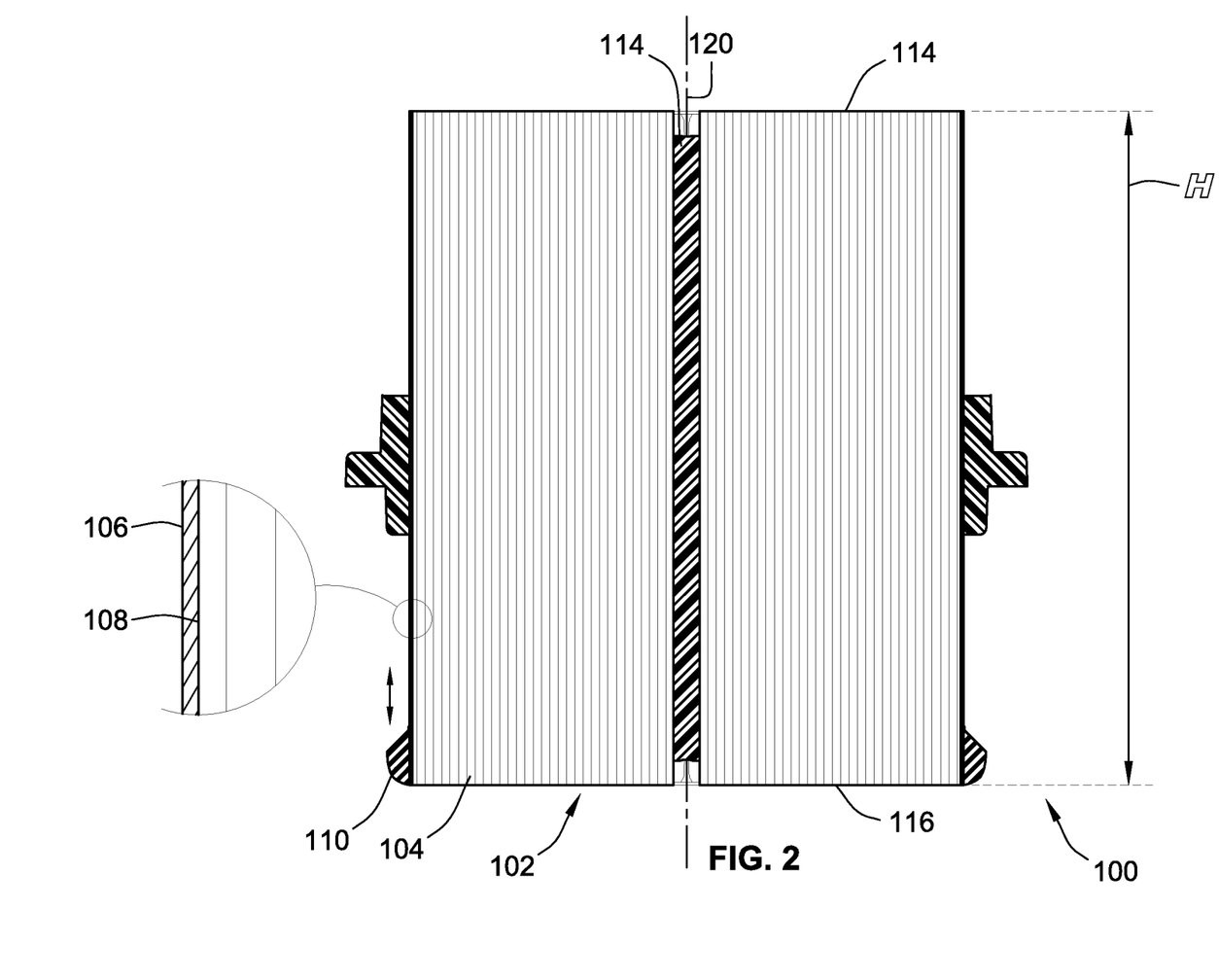
FIG. 2 is a cross-sectional illustration of the filter element of FIG. 1.

FIG. 1 illustrates a representative embodiment of a filter element 100 according to the instant invention. The filter element 100 is used for filtering a flow of liquid that passes through the filter element 100. In a particular implementation, the filter element 100 is designed to filter air passing through the filter element 100.

The filter element 100 is designed to be mounted to a filter housing 160 (see FIG. 5) in a sealing manner to prevent fluid bypass around the filter element 100 and to force the fluid through the filter element 100 to remove impurities.

The filter element 100, in the embodiment of FIG. 1, has a media pack 102 that includes a filter media block 104 and a porous outer layer 106 operably secured to an outer peripheral surface 108 of the filter media block 104.

The filter media block 104, in one embodiment, is formed from layers of fluted filter media. The layers of fluted filter media are formed from a two sheets of filter media secured together. In this embodiment, a flat first sheet of filter media (also referred to as "a face sheet" or "single face") is operably secured to a second corrugated sheet of filter media to form a plurality of axially extending inlet and outlet flutes that are operably sealed to force the flow of fluid to pass through the flat sheet or the corrugated sheet to filter impurities from the fluid flow. The fluted filter media may also be referred to as Z-media. Further, the fluted filter media could be formed from two sheets of corrugated sheets filter media.

The fluted filter media of the combined sheets of filter media are then, in the illustrated embodiment, wound around a winding core 112 to form a plurality of layers of fluted filter media as is well known in the art to form the filter media block 104. An adhesive is provided between adjacent layers to secure the layers together and to seal the adjacent layers and prevent a path for unfiltered air to bypass the filter media and further form the inlet and outlet flutes.

In the illustrated embodiment, the filter media block 104 is generally race-track shaped however the present invention may utilize filter media blocks 104 of other shapes, such as for example, round, oval, rectangular, triangular, etc. Further, while the filter media block 104 in the illustrated embodiment has generally flat opposed flow faces 114, 116 through which the fluid flows, other embodiments could have the flow faces form recesses or projections, e.g. by having adjacent layers axially offset from one another forming a projection at one flow face and a corresponding recess at the other flow face.

The flutes of the fluted filter media will extend axially between the opposed flow faces 114, 116. One face 114, 116 will be considered an inlet flow face in which dirty fluid enters the filter media block 104 while the opposed flow face 116, 114 will be considered an outlet flow face through which cleaned fluid exits the filter media block 104.

In some implementations, the fluid will be drawn through the filter media block 104 by a vacuum downstream of the outlet flow face (see e.g. FIG. 5), such as in an engine environment. Further, such as in the engine environment, the flow of fluid (air) will fluctuate such that the filter media block 104 will be exposed to higher and lower amounts of pressure drop due to the changing flow rate. The negative pressure across the filter media block can cause the filter media block 104 to reduce in size. The amount of change in size varies depending on the amount of pressure drop across the filter media block 104. It has been found that this cyclic loading coupled with the axial loading applied to the filter media block due to the pressure drop can cause outer layers of the filter media block to delaminate or otherwise decouple from one another providing the possibility of a leak path. This is particularly true in filter media of the filter media block 104 is a cellulose material.

The outer layer 106 extends around an outer peripheral surface 108 and is operably secured thereto to help counter act the problems associated with the cyclic loading and the amount of loading that is applied during use of the filter element 100.

Further, a seal member 110 is attached to the outer layer 106 and around the outer periphery of the media pack 102. In the illustrated embodiment, the seal member 110 is directly attached to the outer periphery of the media pack 102. The outer layer 106 forms a securement means to help direclty secure the seal member 110 to the media pack 102 as well as to strengthen the connection between the outer most layers of fluted filter media of the filter media block 104 and counteract any weakening of the media pack 102 that occurs.

Typically, the filter media block 104 will be formed of a first porous material sized and configured to filter impurities of a particular size while allowing clean fluid to flow therethrough. The outer layer 106 that surrounds the filter media block 104 will be formed of a second, different porous material. In one embodiment, the porosity of the first material is different than the porosity of the second material. Preferably, the porosity of the second material is greater than the porosity of the first material. Further, the outer layer 106 can have some capacity for holding impurities, such as dust in an air filter embodiment.

To provide improved strength to the pack, in some implementations, the first material of the filter media block 104 has a first tensile strength and the second material forming the outer layer 106 has a second tensile strength that is greater than the first tensile strength at least in a circumferential direction extending circumferentially around the filter media block 104, e.g. around central axis 120 of the filter media block 104 extending axially between the first and second flow faces 114, 116.

In an embodiment, the first material of the filter media block 104 has a Mullen burst strength of between about 15 psi and 30 psi and in a more particular embodiment between 20 psi and 27 psi. Further, the second material forming the outer layer 106 may have a Mullen burst strength greater than 50 psi. In some embodiments, the burst strength is greater than 75 psi and in further embodiments the Mullen burst strength is 100 psi. In further embodiments, the Mullen burst strength of the outer layer 106 is greater than 250 psi. It is contemplated that the Mullen burst strength will typically be less than 400 psi but it could be greater in some applications.

In some embodiments, the peak load strength for a 1" wide strip of the second material forming the second will be between 120 lbs and 170 lbs and preferably at least 135 lbs. The peak load strength for a 1" wide strip of material for the filter media of the filter media block 104 may be between 25 lbs and 60 lbs and more preferably between 30 lbs and 45 lbs.

In some embodiments, the filter media block 104, as noted above, can be formed from a cellulose material while the second material forming outer layer 106 is formed from a polyester material and particularly a non-woven fabric and even more particularly a spun bond material. The second material is non-metallic. In one embodiment, the second material forming the outer layer 106 may have a unit weight of between 6 oz and 10 oz per square yard and more preferably between 7 oz and 9 oz per square yard.

The seal member 110 can take several forms and in one embodiment is a molded in place seal formed from a foamed urethane or polyurethane foam material. The increased porosity of the outer layer 106 helps secure the seal member 110 to the media pack 102 as the increased porosity increases the degree to which the mold in place material can penetrate into the outer layer 106 of the media pack 102 to increase the adhering capabilities of the seal member 110. In one embodiment, the engagement between the seal member 110 and the outer layer 106 allows the seal member 110 and the securement of the outer layer 106 to the filter media block 104 is such that failure will occur at a load of greater than 35 lbs/inch of seal surrounding the filter media block 104. Failure may be either failure of the seal member 110, the engagement between the seal member 110 and the outer layer 106 or failure of the underlying media block 104.

In the illustrated embodiment, the outer layer 106 and the filter media block 104 have a height H that is the same such that the outer layer 106 covers the entire height of the filter media block 104 extending between the first and second flow faces 114, 116. However, in other embodiments, the height of the outer layer 106 may be less than the entire height of the filter media block 104. In some embodiments, the height of the outer layer 106 may be 50% or more of the height of the filter media block 104 and more particularly at least 75% of the height of the filter media block 104.

To provide the benefit to the attachment of the seal member 110, it is preferred that when the outer layer 106 extends less than the entire height of the filter media block 104, e.g. not entirely between both flow faces 114, 116, the portion of the outer layer 106 is located at an axial position along central axis 120 where the seal member 110 will be mounted to the media pack 102.

With reference to FIG. 1, the outer layer 106 is a single wrap of material. The outer layer 106 further extends less than the entire outer circumference of the filter media block 104 measured around central axis 120. This is illustrated by edges 122, 124 of the outer layer 106 forming a gap 126 therebetween. The edges 122, 124 in this embodiment extend generally parallel to central axis 120 and to each other.

In this embodiment, the seal member 110 overlaps the gap 126 and edges 122, 124. The seal member 110 includes a portion that extends into the gap 126 and around edges 122, 124 to prevent a leak path therebetween.

The outer layer is preferably attached to the outer peripheral surface 108 of the filter media block 104 by an adhesive material. In one embodiment, the adhesive material will be applied to the outer peripheral surface 108 in a non-uniform manner and will not cover the entire outer peripheral surface 108. As such, the adhesive will not form an outer non-permeable wall that surrounds the filter media block 104. In one embodiment, the adhesive material is applied in a random orientation using a spraying process. In other embodiments, the adhesive may be applied using a roller mechanism.

Figure 3:
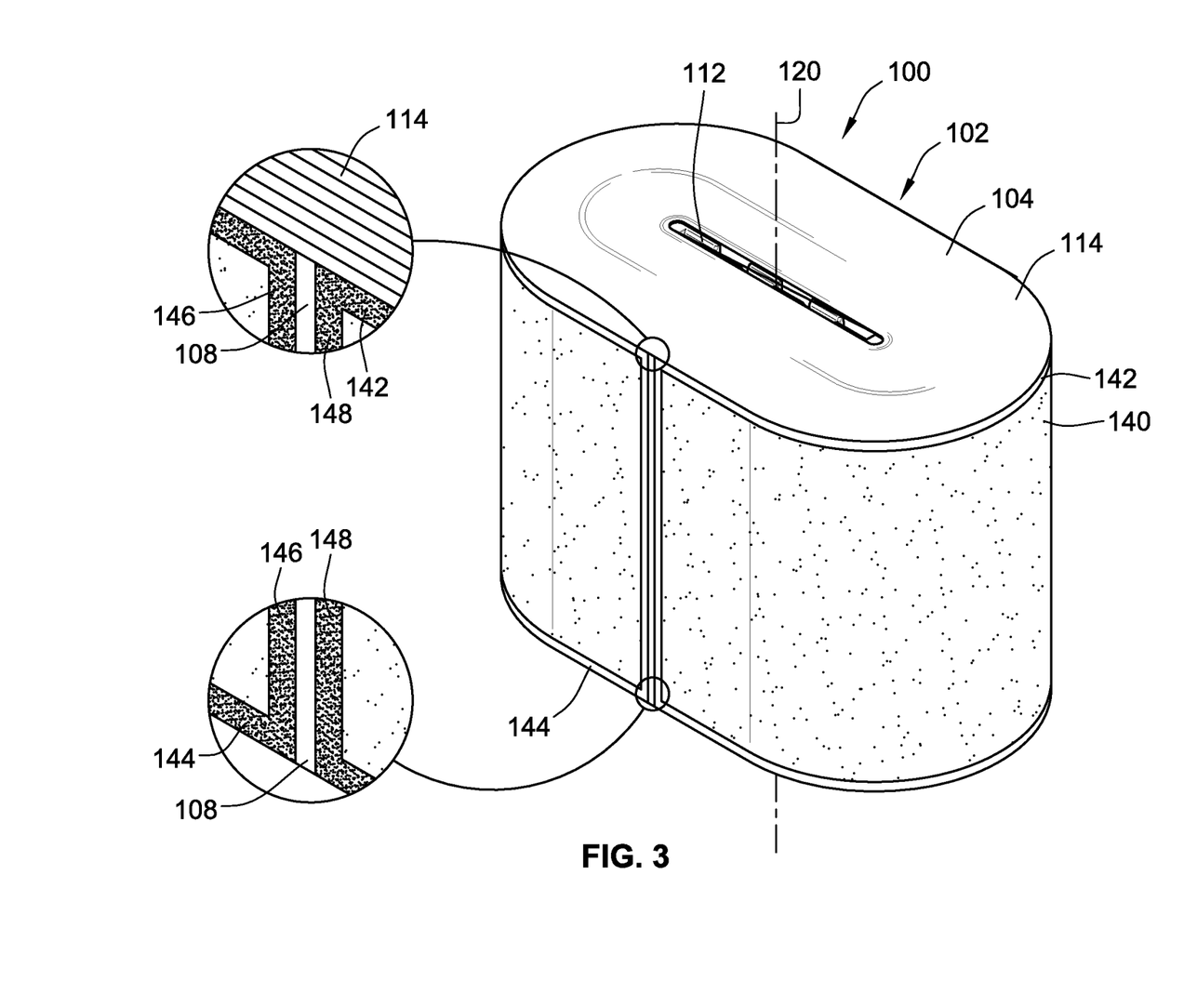
FIG. 3 is an isometric illustration of the filter media block of FIG. 1 with adhesive applied randomly thereto using a spray application prior to applying an outer layer.

FIG. 3 illustrates the filter media block 104 prior to addition of the outer layer 106 in schematic form. In this embodiment, the adhesive 140 is applied is sprayed on the outer periphery 108 of the filter media block 104. However, the adhesive also includes two heavy adhesive beads 142, 144 proximate the first and second flow faces 114, 116 to help secure the top and bottom edges of the outer layer 106 (not shown in FIG. 3). Further, two vertical heavier strips of adhesive 146, 148 are applied that align with the edges 122, 124 (see FIG. 1) of the outer layer 106 when attached thereto. The strips of adhesive 142, 144, 146, 148 help secure the edges of the outer layer 106 to the filter media block 104.

The adhesive 140 preferably is uniformly applied on the outer periphery of the filter media block and extends, preferably, at least 25% the length between the first and second flow faces 114, 116 and more preferably 50% the length between the first and second flow faces. The use of the outer layer 106 secured using the adhesive helps distribute the loading applied to the seal member (see FIG. 1) to a large portion of the outer periphery of the filter media block to prevent localized forces acting at the edge of the seal member directly on the filter media itself.

Figure 4:
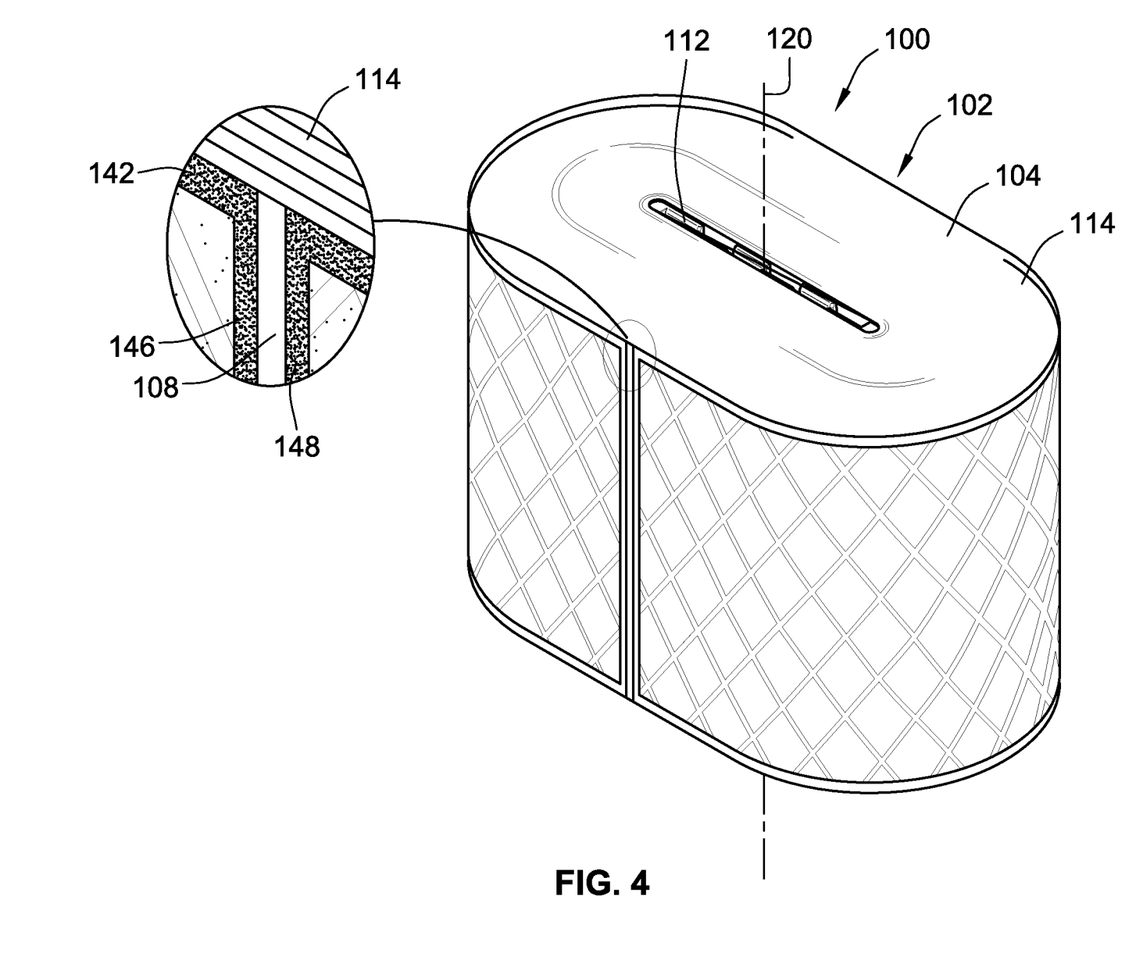
FIG. 4 is an isometric illustration of the filter media block of FIG. 1 with adhesive applied in a more uniform manner, such as using a roller application, prior to applying an outer layer.

The embodiment of FIG. 4 is similar to the embodiment of FIG. 3 but provides a more uniform pattern of adhesive. In this embodiment, the adhesive is arranged as a plurality of crossing strips of adhesive. The heavier strips of adhesive 142, 144, 146, 148 are also applied. The more uniformly applied adhesive could be applied using a roller type applicator.

The outer layer 106, again, helps strengthen the filter media block 104 while providing an improved base structure to secure the seal member 110. This is particularly true as filter media such as a cellulose material can be rather fragile and will fail under high loading of the vacuum presented at the outlet face of the media pack. This is even more applicable if the filter media block 104 is exposed to moisture. Again, as noted above, when the seal member 110 is directly molded or otherwise applied to the filter media, failure of the filter media can occur at the edge of the seal member 110. However, the use of the outer layer 106 of a stronger material can help distribute the loading over a larger area of the outer periphery of the block of filter media 104 to reduce the likelihood of failure and/or to allow the filter element 100 to accommodate larger loading.

While the seal member 110 is illustrated as a mold-in-place style seal, the seal member could be a multi-component seal member that includes a rigid component such as a frame or band type member that surrounds the filter media block 104 and that is adhesively secured to the filter media pack 102 by an adhesive. A compliant seal could then be secured to the frame or band type member by adhesive, tension, or molding as is generally known in the art. However, the inclusion of the outer layer 106 would improve the attachment of the seal member to the media pack 102 as it would improve the engagement of the adhesive securing the multi-component seal member to the filter media pack 102.

Figure 7:
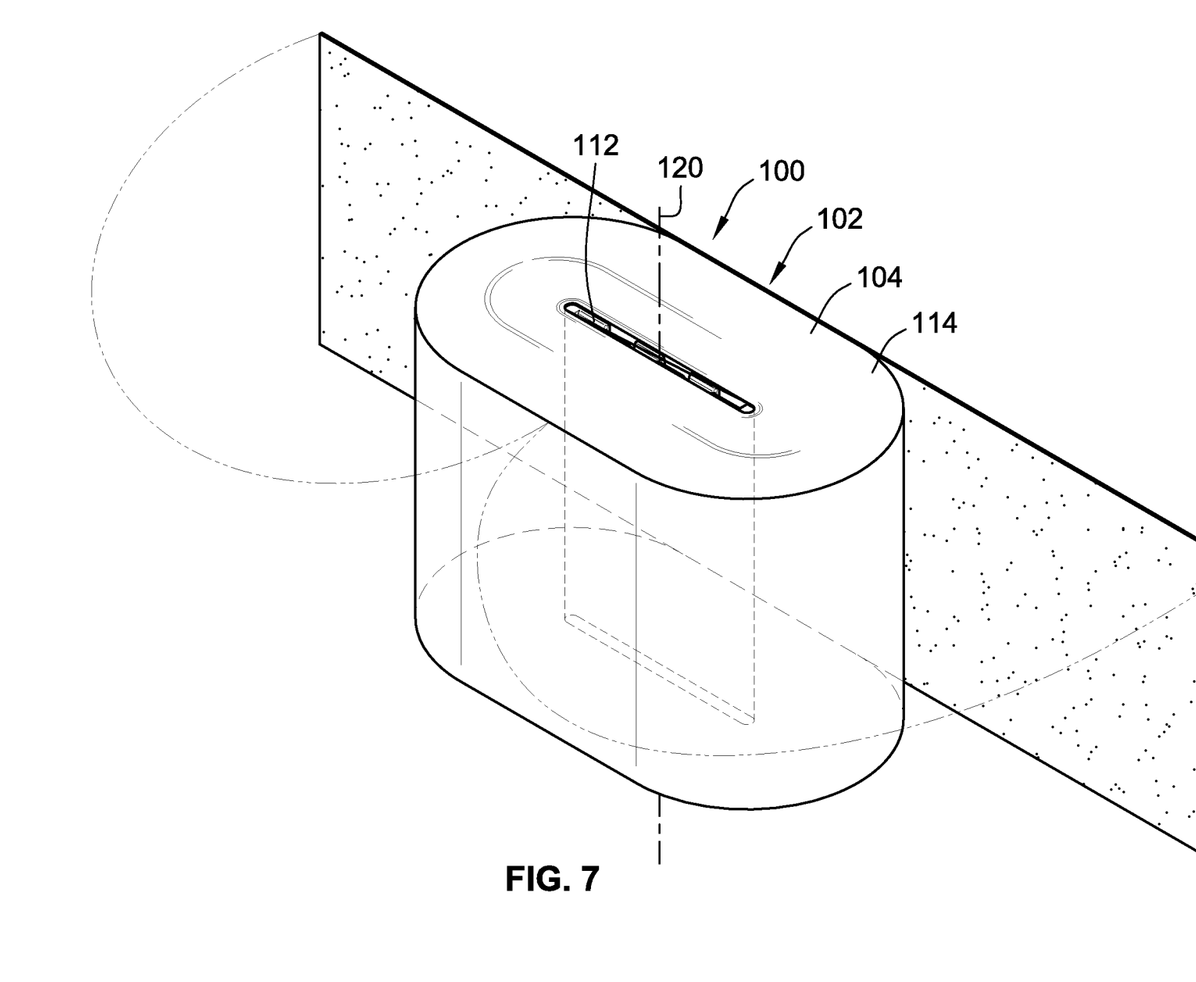
FIG. 7 is a simplified illustration of an alternative method of attaching the outer layer to a filter media block.

While the embodiments of FIGS. 3 and 4 illustrate the adhesive being applied to the outer periphery of the block of filter media and then the applying the outer layer, other embodiments may apply the adhesive in a manner as illustrated in FIGS. 3 and 4 to the outer layer and then the outer layer and adhesive is applied to the block of filter media, see e.g. FIG. 7. In FIG. 7, the adhesive is applied to the material forming the outer layer and the outer layer is wrapped around the filter media block 104.

One benefit of applying the adhesive to the outer layer first is that the strips of adhesive that area that are located proximate the edges of the outer layer are applied to the outer layer such that it can be confirmed that proper placement of the strips of adhesive is in the proper location. However, as illustrated in FIGS. 3 and 4, if the adhesive is applied to the block of filter media first, then it may be more difficult to align the outer layer, and particularly the edges thereof, with the strips of adhesive pre-applied to the block of filter media. This provides improved control of the location of the adhesive strips relative to the edges of the outer layer. Further, it is easier to apply the adhesive to a flat piece of the outer layer rather than applying it to the three-dimensional block of filter media.

Further, while the prior embodiments illustrate the inclusion of the heavier strips of adhesive proximate the edges of the outer layer, these heavier strips are not required in all embodiments.

Figure 5:
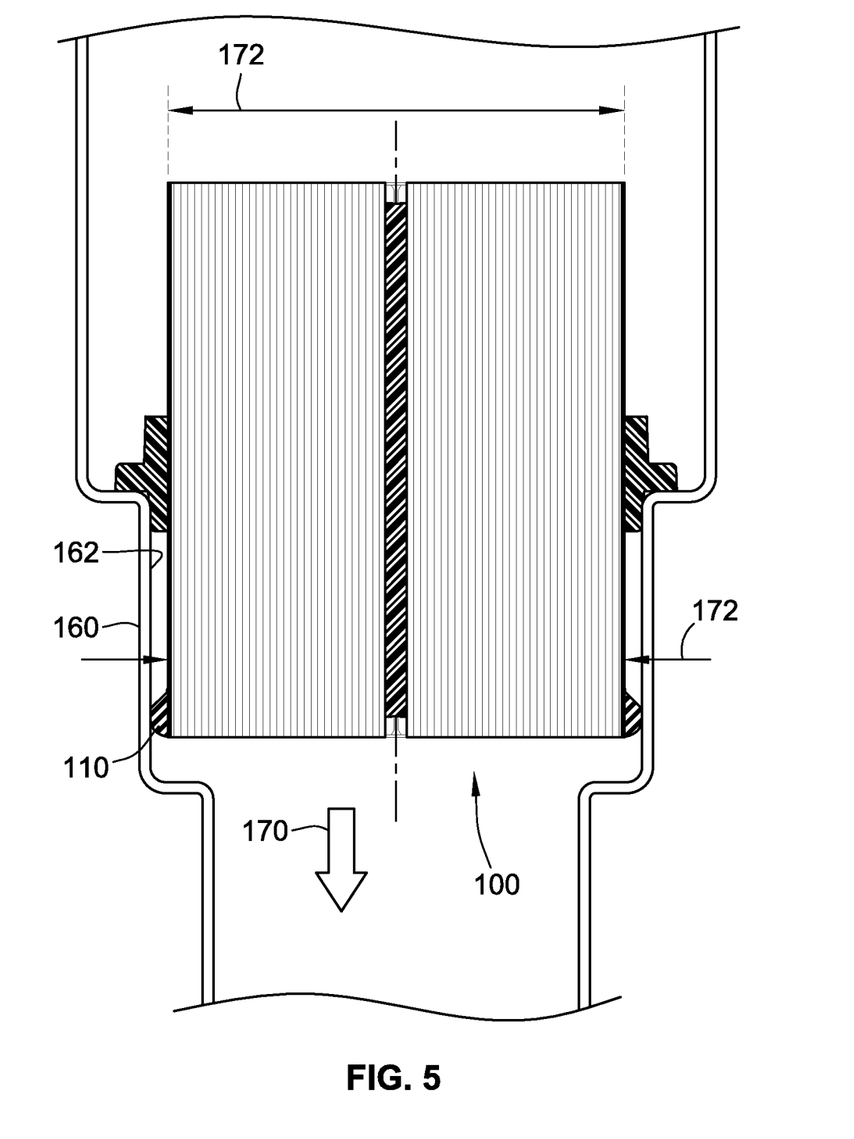
FIG. 5 is a simplified illustration of a filtration system incorporating the filter element of FIG. 1 in a filter housing.

FIG. 5 illustrates the filter element 100 mounted within a schematically illustrated housing 160 with seal member 110 sealing on an inner surface 162 of the housing 160. Due to a vacuum (illustrated by arrow 170) provided by downstream systems the filter element will compress radially inward as represented by arrows 172 as discussed above.

FIG. 5 also illustrates a mounting structure 173 attached to the outer periphery of the media pack that surrounds outer layer 106. Typically, the mounting structure 173 is provided by a rigid plastic material, such as a molded plastic that is adhesively attached to the media pack. The inclusion of the outer layer 106 between the filter media block 104 and the mounting structure 173 provides an improved structural attachment of the mounting structure 173 for the same reasons as the structural attachment for seal member 110. Much like the seal member 110, the axial forces acting on the mounting structure 173 are distributed over a larger portion of the filter media block 104 than when the mounting structure 173 is directly adhesively secured to the filter media block 104.

Figure 6:
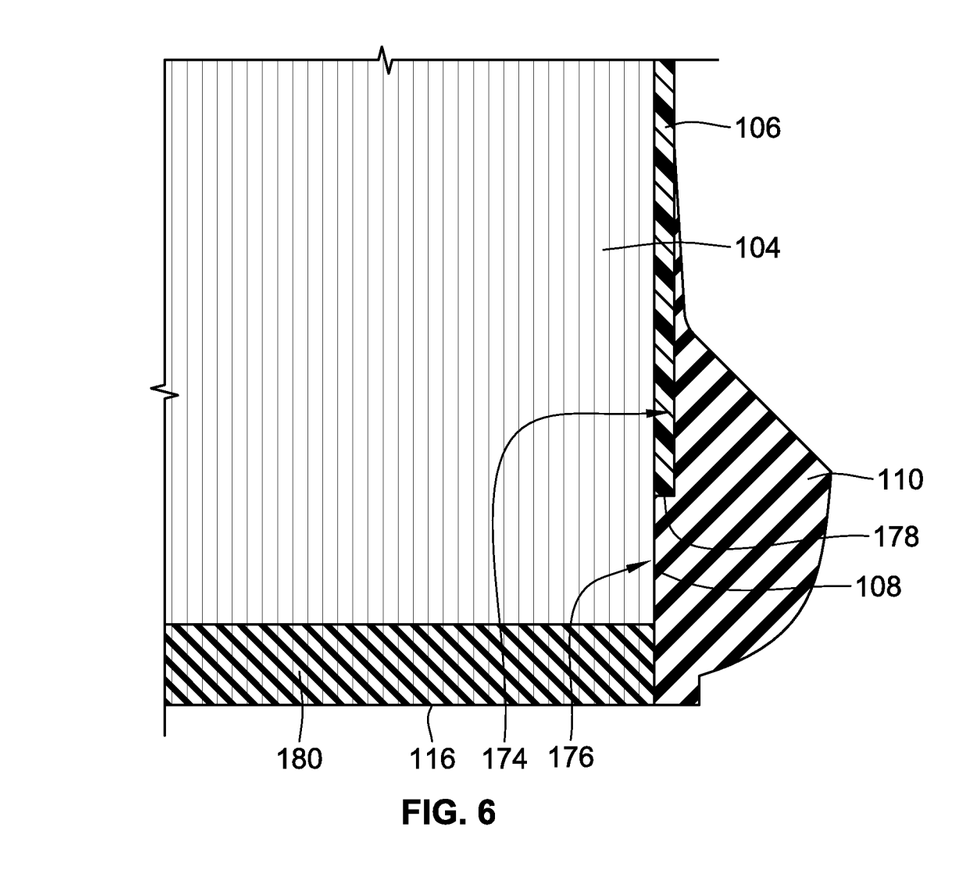
FIG. 6 is an enlarged illustration of the seal member of the filter element of FIG. 1.

FIG. 6 illustrates an enlarged cross-section of the filter element 100 proximate the seal member 110. In this embodiment, the seal member 110 has a first portion 174 that overlaps the outer layer 106 and a second portion 176 that is axially offset from the outer layer 106 and that directly contacts the outer periphery of the filter media block 104.

The first portion 174 provides a strong mechanical connection of the seal member 110 to the filter media block by interacting with outer layer 106 as described above.

The second portion 176 provides an improved sealing relationship between the seal member 110 and the filter media block 104. The second portion 176 is free of any interference between the seal member 110 and the outer periphery of the filter media block 104 that could be provided by the presence of outer layer 106 and the adhesive securing the outer layer 106 to the outer periphery of the filter media block. The second portion 176 will provide, in some embodiments, a continuous band of the seal material that directly contacts the outer periphery of the filter media to prevent any undesirably leak paths that could be created by the presence of the outer layer 106 and/or the adhesive for securing the outer layer 106.

In this embodiment, the outer layer 106 does not extend the entire axial distance between the opposed flow faces of the filter media block 104. As illustrated in FIG. 6, the edge 178 of the outer layer 106 is axially offset from flow face 116. This provides a portion of the outer periphery 108 of the filter media block 104 that is not covered by the outer layer 106 that is exposed to the seal member 110 for engagement with the second portion 176 of the seal member 110. This provides an improved seal between the seal member 110 and the filter media block 104 without interference of the outer layer 106.

While not illustrated, in some embodiments, the filter media block 104 may include the adhesive reinforcing structure as described in co-pending International Patent Application having serial number PCT/US2015/054739 (referred to as "the '739 application") filed Oct. 8, 2015, owned by the owner of the instant application, the teachings of which are incorporated herein by reference thereto in their entireties.

When using an adhesive reinforcing structure as described in the '739 application the reinforcing structure may overlap with the outer layer 106. In other embodiments such as illustrated in FIG. 6, the outer layer 106 may extend less than the entire distance between the first and second flow faces and the reinforcing structure 180 (illustrated schematically) is axially offset from the outer layer 106. The combination of the reinforcing structure and the outer layer 106 described above provides improved stability and strength to the filter media pack 102.

It is preferred to have the adhesive reinforcing structure described in the '739 application offset from the outer layer 106 because as the adhesive reinforcing structure cures, the local outer periphery of the media block 104 adjacent the adhesive reinforcing structure 180 may contract providing less than ideal mating between the outer layer 106 and the filter media block 104.

In FIG. 6, the second portion 176 of the seal member overlaps with the reinforcing structure 180. However, any potential contraction of the filter media block 104 due to curing of the reinforcing structure 180 is irrelevant in this design as the seal member 110 is molded in place and can compensate for any reduction in peripheral size of the filter media block 104.

Some methods of forming filter elements include: first forming a filter media block of the first filter material; applying the adhesive reinforcing structure to the filter media block; curing the adhesive reinforcing structure; attaching the outer layer formed by the second material to an outer periphery of the block of filter media; and attaching a seal member to the filter media block. Some of these steps may be optional depending on the particular filter element, such as applying the adhesive reinforcing structure and curing the adhesive reinforcing. Further, while not optimal, the order of some of the steps can be altered. For instance, curing of the adhesive reinforcing structure (when present) may occur before or after the steps of attaching the outer layer and attaching the seal member.

Methods may include attaching the seal member such that a first portion axially overlaps the outer layer and a second portion axially overlaps only the outer periphery of the filter media block such that there is no interference of the outer layer with a seal between the seal member and the filter media of the filter media pack to reduce the opportunity for leak paths to be present. However, other embodiments are contemplated that would have the entire seal member axially overlap the outer layer 106.

"Axial overlap" as used herein refers to a relative position where two components are at a same axial location between the first and second flow faces. As such, when the first portion 174 is in axial overlap with the outer layer 106, the two components have portions that are at the same axial location between the opposed flow faces. In the embodiment of FIG. 6, the first portion 174 is in axial overlap with the outer layer 106 and the outer layer 106 is positioned radially between the first portion 174 and the filter media block 104. However, no portion of the outer layer 106 is positioned in axial overlap with the second portion 176 nor is any portion of the outer layer 106 positioned radially between the second portion 176 and the filter media block 104.

Other means for improving direct attachment of a seal member 110 to the filter media pack 102 may also be provided. For instance, in one embodiment, it is contemplated that physical manipulation of the of the outer periphery of the filter media pack 102, such as by way of abrasion or perforation, may occur to improve the adhesion of a directly secured seal member 110 to the filter media pack 102. This may occur in a filter media pack that does not include outer layer 106 described above. The manipulation of the outer periphery is contemplated to promote improved absorption of the seal material into the outer periphery to improve the engagement between the filter media pack 102 and the seal member 110.

In another embodiment it is contemplated that the media pack 102 could include an outer layer applied such as by way of painting or liquid deposition of a material to form the outer layer which is then allowed to cure. The material would be configured or deposited in such a way that it would promote absorption of the seal material forming the seal member and/or improve engagement between the media pack 102 and the seal member 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
    a media pack including:
        a filter media material forming a block of filter media defining an outer peripheral surface extending between a first flow face and a second flow face;
        a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;
    a first seal attached to the media pack, the first seal having a first portion in axial overlap with the outer layer and a second portion in axial overlap with the potion of the outer periphery that is not covered by the outer layer; and
    wherein the filter media and second material are permeable, the filter media has a first porosity and the second material has a second porosity that is greater than the first porosity.

2. The filter element of claim 1, wherein the first seal is a mold in place seal.

3. The filter element of claim 1, wherein the first and second portions of the first seal are formed as a continuous body of seal material.

4. The filter element of claim 1, wherein the filter media has a first tensile strength that is less than a second tensile strength of the second material.

5. The filter element of claim 1, wherein the second material extends axially between the first and second flow faces at least fifty percent the axial distance between the first and second flow faces.

6. The filter element of claim 1, wherein the first material has a Mullen burst strength that is less than the Mullen burst strength of the second material.

7. The filter element of claim 1, wherein the first seal and second material provide an attachment for securing the first seal to the media pack capable of preventing failure from a loading of at least 35 pounds per inch of seal measured around the outer peripheral surface of the block filter media.

8. A method of forming a filter element of claim 1, comprising:
providing a block of filter media defining an outer peripheral surface extending between a first flow face and a second flow face;
securing a second material that is permeable to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material; and
attaching a first seal to the media pack, the first seal having a first portion in axial overlap with the outer layer and a second portion in axial overlap with the portion of the outer periphery that is not covered by the outer layer; and
wherein the filter media and second material are permeable, the filter media has a first porosity and the second material has a second porosity that is greater than the first porosity.

9. A filter element comprising:
a media pack including:
a filter media material forming a block of filter media defining an outer peripheral surface extending between a first flow face and a second flow face;
a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;
a first seal attached to the media pack, the first seal having a first portion in axial overlap with the outer layer and a second portion in axial overlap with the potion of the outer periphery that is not covered by the outer layer; and
wherein the filter media is a cellulose material and the second material is a fabric material.

10. A filter element comprising:
a media pack including:
a filter media material forming a block of filter media defining an outer peripheral surface extending between a first flow face and a second flow face;
a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;
a first seal attached to the media pack, the first seal having a first portion in axial overlap with the outer layer and a second portion in axial overlap with the potion of the outer periphery that is not covered by the outer layer; and
wherein the second material is a non-woven polyester fabric.

11. A filter element comprising:
a media pack including:
a filter media material forming a block of filter media defining an outer peripheral surface extending between a first flow face and a second flow face;
a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;
a first seal attached to the media pack, the first seal having a first portion in axial overlap with the outer layer and a second portion in axial overlap with the potion of the outer periphery that is not covered by the outer layer; and
further including an adhesive between the outer peripheral surface of the block of filter media and the second material.

12. A filter element comprising:
a media pack including:
a filter media material forming a block of filter media defining an outer peripheral surface extending between a first flow face and a second flow face;
a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;
a first seal attached to the media pack, the first seal having a first portion in axial overlap with the outer layer and a second portion in axial overlap with the potion of the outer periphery that is not covered by the outer layer;
the second material is a single layer surrounding the block of filter media and extends circumferentially around the block of filter media between a first edge and a second edge;
the first and second edges are spaced apart from one another forming a gap therebetween;
wherein the second material is not overlapped with itself; and
the first seal contacting the outer peripheral surface of the block of filter media between the first and second edges and filling the gap.

13. A filter element comprising:
a media pack including:
a filter media material forming a block of filter media defining an outer peripheral surface extending between a first flow face and a second flow face;

a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;

a first seal attached to the media pack, the first seal having a first portion in axial overlap with the outer layer and a second portion in axial overlap with the potion of the outer periphery that is not covered by the outer layer; and wherein the first seal penetrates into the second material.

14. A filter element comprising:

a media pack including:

a filter media material forming a block of filter media defining an outer peripheral surface extending between a first flow face and a second flow face;

a second material secured to the outer peripheral surface of the block of filter media forming an outer layer surrounding the block of filter media, the second material extending less than an entire distance between the first and second flow faces defining a portion of the outer periphery extending axially between the second material and one of the first and second flow faces that is not covered by the second material;

a first seal attached to the media pack, the first seal having a first portion in axial overlap with the outer layer and a second portion in axial overlap with the potion of the outer periphery that is not covered by the outer layer; and wherein the second material is non-metallic and is secured to the outer peripheral surface of the block of filter media with an adhesive between the outer peripheral surface of the block of filter media and the second material.

\* \* \* \* \*

UNITED STATES PATENT AND TRADEMARK OFFICE
CERTIFICATE OF CORRECTION

PATENT NO. : 10,814,263 B2
APPLICATION NO. : 15/777532
DATED : October 27, 2020
INVENTOR(S) : Timothy L. Krull et al.

Page 1 of 1

It is certified that error appears in the above-identified patent and that said Letters Patent is hereby corrected as shown below:

In the Claims

Column 12, Claim 1, Line 53, reads: "a second portion in axial overlap with the potion of the" and should read --a second portion in axial overlap with the portion of the--

Column 13, Claim 9, Line 52, reads: "a second portion in axial overlap with the potion of the" and should read --a second portion in axial overlap with the portion of the--

Column 14, Claim 10, Line 6, reads: "a second portion in axial overlap with the potion of the" and should read --a second portion in axial overlap with the portion of the--

Column 14, Claim 11, Line 28, reads: "a second portion in axial overlap with the potion of the" and should read --a second portion in axial overlap with the portion of the--

Column 14, Claim 12, Line 50, reads: "a second portion in axial overlap with the potion of the" and should read --a second portion in axial overlap with the portion of the--

Column 15, Claim 13, Line 12, reads: "a second portion in axial overlap with the potion of the" and should read --a second portion in axial overlap with the portion of the--

Column 16, Claim 14, Line 12, reads: "a second portion in axial overlap with the potion of the" and should read --a second portion in axial overlap with the portion of the--

Signed and Sealed this
Twelfth Day of January, 2021

Andrei Iancu
*Director of the United States Patent and Trademark Office*